April 14, 1942.                    D. EDGE                    2,279,917
                            CONTINUOUS FURNACE
                          Filed March 9, 1940                 2 Sheets-Sheet 1
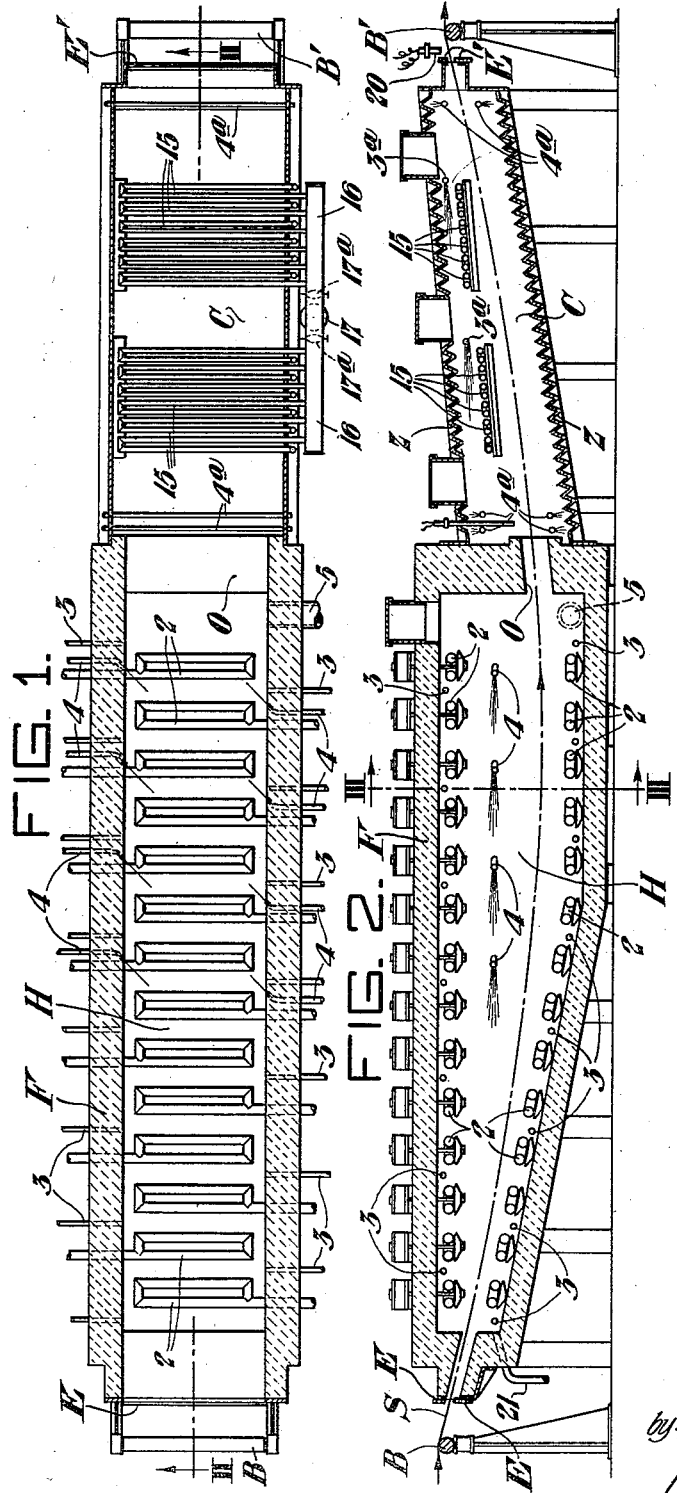
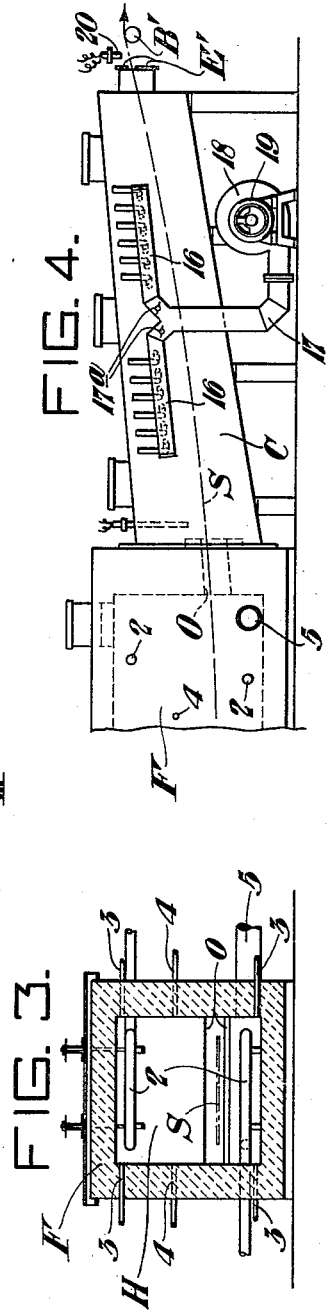
Inventor:
DEXTER EDGE,
by John E. Jackson
his Attorney.

April 14, 1942.    D. EDGE    2,279,917
CONTINUOUS FURNACE
Filed March 9, 1940    2 Sheets-Sheet 2
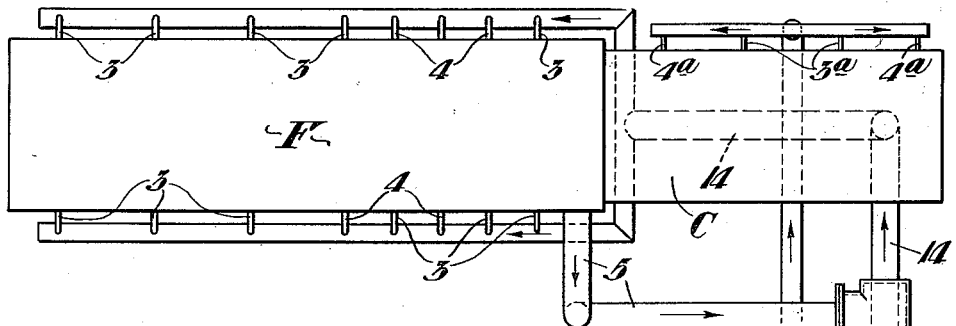
FIG. 5.
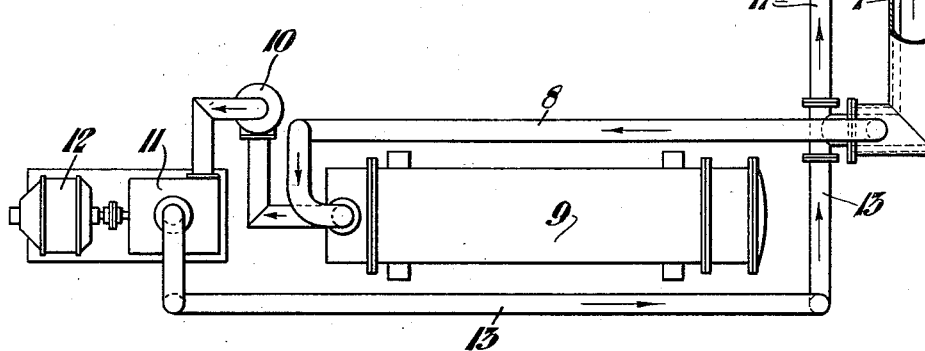
FIG. 6.
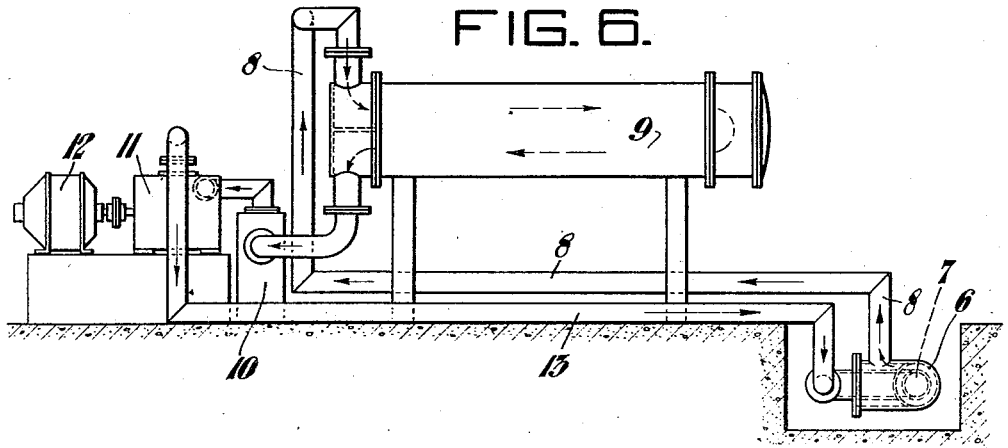
Inventor:
DEXTER EDGE,
by: John E. Jackson
His Attorney Patented Apr. 14, 1942

2,279,917

UNITED STATES PATENT OFFICE 2,279,917

CONTINUOUS FURNACE

Dexter Edge, Gary, Ind.

Application March 9, 1940, Serial No. 323,205

15 Claims. (Cl. 266—3)

This invention relates to continuous type heat treating furnaces within which metallic material in the form of strip, sheet, rod or wire, may be subjected to any desired heat treating process.

The features described hereinafter may be applied to any of the present designs of furnaces of either the gas or oil fired radiant tube or the electrically heated type.

Prior designs of these types of furnaces, such as annealing furnaces, for example, are open to one or more of several objections. In some instances the metallurgical results obtained are not satisfactory and in other cases the production efficiency of the furnace is low. Under this latter condition a production "bottle neck" may be developed which causes an appreciable decrease in the high speed production sought by the continuous methods of operation now preferred.

The non-uniform metallurgical results are attributable, in part, to the necessity of having the heat sources; radiant tubes or resistors, for example, located only at spaced intervals, thereby subjecting the material to localized non-uniform heating effects during its continuous passage through the furnace heating zone. The non-uniform results are also partly due to the condition set up by the nature of the material, for example, steel strip, undergoing heat treatment; its position in the furnace with respect to the radiant sources and its dimensions relative to the internal dimensions of the furnace interior.

By the use of my invention I am able to increase the production rate of any given furnace.

(a) By increasing the quantity of heat which a given heating system can produce, without injury to the system itself.

(b) By increasing the rate of heat transfer from the heat sources to the furnace interior.

(c) By increasing the rate of heat absorption in the material being heat treated.

(d) By providing a more uniform temperature within the furnace interior and thus decreasing the "soaking" time required.

(e) By increasing the rate of cooling of the strip under heat treatment.

By the flexible control provided for each of the heating and cooling elements, I am also able to produce a wider variety of products, each having more uniform and improved metallurgical qualities. Fewer heat treating units are necessary and the plant floor space requirements are decreased by this as well as by the fact that each unit is more compact and is of substantially smaller physical dimensions.

The equipment and arrangements by which I accomplish the results indicated above will be apparent to those skilled in the art upon considering this specification in conjunction with the drawings, of which:

Figure 1 is a plan of the furnace and cooling chamber;

Figure 2 is a section on the line II—II of Figure 1;

Figure 3 is a section of the furnace on line III—III of Figure 2;

Figure 4 is an elevation of the cooling chamber;

Figure 5 is a plan of the furnace and cooling chamber showing a gas system for supplying the same with a proper atmosphere; and Figure 6 is an elevation of this system.

In accordance with the arrangement shown in Figure 2, a strip S having been previously finished to the desired gage, is delivered to the heat treating furnace F by way of a sealed entrance E. The strip S is passed over a billy roll B, which is mounted at the entry end of the furnace F. The forward end of the strip S is led through the heating zone H and the cooling zone C of the furnace and on through a sealed exit E' thereof, over a second billy roll B'.

It will be observed in Figure 2 that the strip S is unsupported throughout the entire length of the furnace F and the cooling zone C, and therefore assumes the catenary form. A conventional electrical control device, such as a hatchway limit switch, not shown, is employed to control the amount of catenary suspension. This catenary suspension has been provided in view of my observation that when material is heated to within a heat treating range of temperature, the surface becomes very susceptible to marking by the supporting and conveying means, such as rollers or disks. This marking of the surface of material at elevated temperature is due to two causes. Firstly, the temperature of that portion of the surface which is in contact with the supporting disks differs appreciably from the temperature of the adjacent untouched surface and a different metallurgical effect is thereby produced. Secondly, when a strip is rapidly conveyed from an atmospheric temperature into a furnace at heat treating temperature of, for example, 1300° Fahrenheit, the linear expansion is on the order of .01 of an inch per foot. Therefore, if the strip is supported by conveying rollers or disks spaced apart at a distance of one foot, the strip moves forward on the rollers .01 of an inch on expansion and rearwardly, upon cooling, the same distance on subsequent contraction. The drag slip set up by this motion results in marks on the surface of the material. It is for the purpose of avoiding this result that the furnace of my invention is designed so that the strip, while at elevated temperature, is neither supported by, or is in contact with, any object.

I am aware of various prior designs of furnaces which employ the catenary type suspension. The most applicable of these designs is that of the type disclosed in Otis patent No. 2,060,634 issued November 10, 1936. In this type it is to be observed that, as the furnace lacks the features to be hereinafter described, it is necessary to elevate the entry end of the furnace and to lower the opening between the heating and cooling chambers in order to provide for free catenary suspension. Further, in order to minimize the length of the catenary, it is necessary to provide a preheating chamber in which the strip may be supported and a secondary cooling chamber for the same purpose. These provisions, essential to this type, add materially to the length of the furnace, to its cost, and to the floor space requirement.

The next feature of my invention to be described is the means by which I am able to increase the quantity of heat developed by a heating system, the rate of transfer from the source to the furnace interior and the rate of absorption of heat by the material undergoing treatment. The increase obtained in each of these factors cumulatively assists in decreasing the required length of catenary suspension.

For purposes of illustration, the radiant tube type of heat source is shown (Figures 1, 2 and 3). This type of tube may be any one of the various well known commercially available units in which air and fuel gas or oil are mixed in a desired proportion and burned within the tube, utilizing the recirculating principle, if desired, the products of combustion being conducted away thereafter.

The radiant tubes 2 are horizontally disposed at spaced intervals along the bottom and the roof, and in spaced relation respecting the same, of the heating chamber H of the furnace F, the radiant tube being employed may be of the type in which the burner is inserted into the leg of the element through an extension of this leg, and combustion occurs throughout the length of the tube, the products of combustion exhausting through a suitable stack arrangement. The leg which contains the burner, in which initial combustion occurs, may be heated to a higher radiating temperature than the second or return tube. To minimize the non-uniform heating effects of this condition, I install the radiant tubes in alternate reversed arrangement as shown in Figure 1, the hotter leg of one tube being positioned adjacent the colder leg of the adjoining tube.

To show how the various heat transfers indicated above are effected, attention is next directed to the series of nozzles 3 (Figures 1 and 2) which project horizontally through the side walls and perpendicular thereto, into the interior of the furnace heating zone H. Each nozzle 3 may be located either between the entering and the return leg of each radiant tube or between adjacent radiant elements. The function of each of the nozzles 3 is to direct a stream of gas, moving at high velocity along the surface of each tube.

The benefits in heat transfer resulting from this action will be apparent from the following several considerations.

The capacity of a radiant heating element is limited by the particular maximum temperature which the metal, or other material, of which the element is formed, will withstand, without itself being damaged by the heat developed therein. For example, it may be found that, in transferring a certain quantity of B. t. u.'s, per unit of time through a unit area of radiant tube, the tube arrives at a temperature of, say 1800° Fahrenheit, and that the tube cannot safely be operated at a higher temperature. By the action of a stream of gas, directed by one or more of the nozzles 3, moving along the length of the radiant tube element at high velocity, large volumes of the furnace atmosphere are inspirated and carried along the surface of the tube, thereby absorbing heat from the tube and lowering its temperature. The rate at which B. t. u.'s of heat are transferred through the tube may be then increased until its temperature, under this cooling effect, again reaches the maximum operating value. A substantial gain is obtained in the heat transfer capacity of the element.

It has been universally observed that the surface of any body in an atmosphere, is surrounded by a "parasite" film of the gaseous fluid. This phenomenon exists irrespective of the temperature of either the body or the atmosphere. This film is probably similar to the film of water which adheres to the surface of a solid when it is wetted by the water. Next this "parasite" layer of gas is another layer which moves slowly when the body and the atmosphere are moved relative to one another. Farther away are successive layers, each of which moves somewhat more rapidly than the preceding one until the full velocity of the relative motion is reached. This condition exists about the surface of a radiant heating element and its presence causes an appreciable diminution of the quantity of heat transferred by convection, from the surface of the tube to the surrounding atmosphere. By the previously described action of the stream of gas, utilized in my invention, the parasitic and slow moving layers of gas, which surround the heating element and impede the transfer of heat by convection, are "wiped off" the surface of the element and the rate of heat transfer by convection thereby increased.

The observation immediately preceding has equal application to the conditions of strip material under treatment. The "parasite" layers of gas surrounding the strip have, to an appreciable degree, the effect of an insulating cover on the strip, functioning to impede the transfer of heat from the furnace atmosphere to the strip.

To obtain a "wiping" action the same as just outlined, I provide a second series of cross strip nozzles 4, as shown in Figures 1 and 2. These nozzles project at a horizontal angle through the side walls and into the interior of the furnace heating chamber H. A single row of nozzles 4 may be located above the catenary suspended strip S, as shown in Figures 1, 2 and 3 or two or more rows of these nozzles may be located slightly above and below the line of travel of the strip S. I have found that, ordinarily, the lower row of radiant element nozzles 3 is sufficiently close to the normal catenary position so that this lower row of nozzles performs the function of wiping across the bottom of the strip. In any case the action of these nozzles 4 upon the surface of the strip S is similar to that of the nozzles 3 upon the surface of the heating elements 2. The "parasitic" insulating layers of gas are forcefully "wiped" off the surface of the strip by the high velocity stream and the convection currents present are fully utilized to effect heat transfer to the strip.

It will be noted that both series of nozzles, 3 and 4, are placed in alternate opposed relation. The purpose of this arrangement is to obtain the maximum possible turbulence in the furnace interior. Each of the high velocity streams has an appreciable inspirating effect, pulling the surrounding furnace atmosphere along with it, which results in the complete mixing of all portions of the atmosphere. The heat units present in the furnace atmosphere are literally rubbed into the strip S. The benefits derived reside in the fact that all portions of the strip are heated to the same degree of temperature and uniform metallurgical reactions which are quickly obtained make it unnecessary to resort to lengthy soaking of the material. With a uniform temperature in the furnace interior, a higher operating temperature may be employed, if desired, without danger of localized overheating.

The gas supplied to the nozzles 3 and 4 to obtain the "wiping" action and turbulence set forth above, may be of either a deoxidizing, an inert or of an oxidizing character. The preferred method of utilizing the gas is to provide a furnace of the desired nature and by a continuous recirculating system, remove a small portion of this atmosphere, cool this portion so that it may be compressed to the desired pressure; compress the cooled gas and then return the high pressure gas to the furnace through the nozzles 3 and 4. In cooling the gas, steam and other undesirable substances are condensed from the gas and the latter is returned to the furnace in a cleaned condition.

The recirculating system by which this furnace atmosphere is obtained consists essentially of a closed system for withdrawing the atmosphere from the furnace, cooling and compressing it, passing the cooled and compressed gas through a heat exchanger so as to deliver hot, controlled atmosphere gas, under pressure, to the nozzles 3 and 4 of the heating zone of the furnace.

Figure 5 shows a preferred arrangement of the recirculating system. The hot furnace atmosphere in the heating zone H is withdrawn from the furnace through the pipe 5, whence it passes through the outgoing element 6 of a heat exchanger. This element 6 contains an inner element 7 in which the atmosphere, after being cooled and compressed is heated, due to the counterflow, and then returned to the heating zone.

The outgoing hot gas passes from the heat exchanger, through a conveyer pipe 8, into a multitube water cooler 9, in which water and other undesirable vapors are condensed. The cooled gas is then passed to a water separator 10 in which the condensate is removed, after which the gas is delivered to the suction side of a compressor 11 driven by a motor 12.

After the gas has been compressed it is passed through a pipe 13 and thence to the inner element 7 of the heat exchanger. The gas picks up heat in this element and passes through a pipe 14 which forms a manifold on both sides of the furnace to supply the cleaned atmosphere, under pressure, to the nozzles 3 and 4 in the heating zone.

The objectionable features of prior furnace designs, previously mentioned with respect to the heating operation, are also present in the cooling operation. This will become apparent from the following consideration.

When ferrous metal in the form of wire, rod or strip, for example, is heated to a temperature above its lower critical point and then cooled, the rate of cooling has an appreciable effect upon the grain structure of the metal, resulting in grain growth. If the metal is cooled slowly, the grain growth will progress to other, and may be less desirable forms, than it would if it were cooled at a more rapid rate. A high rate of cooling will give a refined grain structure to the metal, thereby increasing the elastic limit, tensile strength and ductility of the metal.

The provision of facilities for obtaining a flexible and controled rapid rate of cooling subsequent to the previously described operation is thus shown to be beneficial from the standpoint of desired metallurgical effects. This feature is also desirable on the basis of other considerations, as follows: It will be recalled that the catenary type suspension has been adopted in order to eliminate the surface marking and the non-uniform heating condition caused by conveyer rollers or disks in other types of furnaces. When material in the form of thin gage strip or wire is suspended in a catenary in a heat treating furnace and subjected to a heat treating temperature, the unsupported length or span of the catenary must be severely limited. If the span length exceeds a certain limit, with the sag being held to a practical value, the tension developed in the material, while at elevated temperature, will be sufficient to stretch and distort the metal. Under the close gage tolerance requirement to which it is at present necessary to conform, such material would be rejected and scrapped. Present at the same time as the unsupported span limitation, is the requirement that the cooling zone must be sufficiently long so that the strip will not emerge therefrom until its temperature is at the desired value. If an attempt is made to meet this requirement by slowing up the speed of travel, instead of increasing the length of the cooling zone and the catenary span decreased production results.

By a feature of my invention, now to be described, I am able to utilize the catenary type suspension, without reducing the speed of travel and thus the production, and without unduly straining or otherwise damaging the material under treatment.

Referring to Figure 2 it will be observed that the strip S after being heated to the desired temperature in the heating zone H, passes through an opening O, in the forward wall of this chamber, into the cooling zone C. The top and bottom of this chamber I form of corrugated or zigzag shaped elements Z of heat conducting material, for the purpose of providing increased surface area for the dissipation of the heat in this zone.

Transversely positioned in zone C, above the strip S and on a line parallel to the direction of travel thereof is a series of cooling elements 15. Each of these elements 15 consists of a hollow tube, preferably U-shaped for efficiency, which is connected at one end to a manifold 16. The other end of the U-shaped cooling element may be directed upwardly in the manner of an exhaust stack. A group of these elements are connected at spaced intervals to the manifold 16, which is supplied by a cooling medium, for example, air, through a supply line 17, from blower 18, driven by a motor 19. This arrangement is illustrated as being such that the blower 18 sucks in atmosphere from outside the furnace, the stacks of the cooling elements exhausting this atmosphere outside of the furnace.

A pyrometer 20 is located, on a suitable mounting, immediately beyond the discharge end of the cooling chamber C, to measure the temperature of the material S as it emerges from the furnace F. This pyrometer 20 is connected in an electrical circuit to conventional electric relay and motor control equipment. The motor 19, driving the blower 18, is of the variable speed type, and by operation of the relay or motor operated throttling valve equipment, rendered automatically responsive to the pyrometer 20, the rate of flow of the cooling medium through the cooling elements 15 may be varied to obtain any desired temperature in the material S at the point of discharge into the atmosphere.

One or more series of cooling elements may be employed, as indicated in Figures 1 and 2. Each series may be supplied with the cooling medium by a Y or other suitable connection from the supply line 17. In some instances it may be desired to obtain the major portion of the cooling effect within a particular range of temperature points. In such case, a butterfly or other type valve 17a installed in either or both legs of the Y provides for reducing the flow in one or the other of the series of cooling elements.

If, in addition to the cooling arrangement described above, a more rapid cooling rate is desired, I may utilize the wiping action employed in the heating zone. In such a modification the cooling elements 15 would be used with nozzles 3a and 4a; the nature and arrangement of which would be similar to those indicated as 3 and 4 in the heating zone of the furnace, previously described. The same recirculating atmosphere would be used in the cooling zone as in the heating zone and the same recirculating system would be employed. Instead of passing all of the gas, after it has been cooled and compressed, through the inner element 7 of the heat exchanger, that portion intended for use in the cooling zone nozzles would pass directly from the multitude water cooler 9, through the pipe 17, to the cooling zone nozzles. The cooling effect would be controlled by an arrangement similar to that described above.

Since there may be some leakage of the furnace atmosphere, provision is made for introducing gases at 21 as required to maintain proper conditions inside the furnace. This provides for an appropriate atmosphere that can be continuously recirculated as described. It is to be understood that when the gases are ejected from the various nozzles as described, that high velocity streams or jets must be created, and to this end the compressor 11 should provide a gas pressure of at least two pounds or, preferably, higher, such as in the neighborhood of five pounds pressure. Then, by making the nozzles with small orifices, such as about one-eighth inch in diameter for instance, the desired high velocities can be obtained. Experience has shown that the use of a fan in a furnace is of little value since it can only function to move the furnace gases very slowly if at all, no practical results, therefore, accruing from its use. However, nozzles with larger orifices than one-eighth inch may be used in some cases if care is taken to maintain high ejection velocities.

I claim:

1. Heat treating apparatus comprising an enclosure for work, an elongate radiant work-heat exchanging surface in said enclosure having respectively higher and lower temperatured longitudinal portions and means for ejecting a high velocity gas stream into said enclosure longitudinally of said higher temperatured portion and contacting the same.

2. Heat treating apparatus comprising an enclosure for the work and a series of radiant heat exchangers each having relatively hotter and colder opposite side portions and arranged so that the said hotter portion of each is successively opposite the colder portion of the next one of said series.

3. Heat treating apparatus comprising an enclosure for the work and a series of radiant heat exchangers each having relatively hotter and colder opposite side portions and arranged so that the said hotter portion of each is successively opposite the colder portion of the next one of said series, means being provided for ejecting high velocity gas streams into said enclosure adjacent said portions of successive ones of said exchangers.

4. A continuous heat treating apparatus comprising an enclosure having an entrance and an exit, means for continuously feeding work through said enclosure by way of said entrance and said exit, heat exchangers in said enclosure having surfaces for directly exchanging heat with said work and means for wiping parasitic gas films from said surfaces with high velocity gas streams directed to substantially parallel said surfaces adjacently thereto.

5. A continuous heat treating apparatus comprising an enclosure having an entrance and an exit, means for continuously feeding work in the form of strip through said enclosure by way of said entrance and said exit so said work forms an unsupported catenary loop within said enclosure, heat exchangers having surfaces for directly exchanging radiant heat with said work and means for wiping parasitic gas films from said surfaces with high velocity gas streams ejected into said enclosure so as to parallel said surfaces adjacently thereto.

6. A continuous heat treating apparatus comprising an enclosure having an entrance and an exit, means for feeding work continuously through said enclosure by way of said entrance and said exit, heat exchangers providing a series of elongate heat exchanging surfaces arranged transversely to the travel of said work for exchanging heat with the latter, and means for ejecting high velocity gas streams into said enclosure longitudinally of said surfaces and adjacent the same.

7. A continuous heat treating apparatus comprising an enclosure having an entrance and an exit, means for feeding work continuously through said enclosure by way of said entrance and said exit, heat exchangers providing a series of elongate heat exchanging surfaces arranged transversely to the travel of said work for exchanging heat with the latter, and means for ejecting high velocity gas streams into said enclosure longitudinally of said surfaces and adjacent the same, the last-named means ejecting a series of said streams alternately from opposite ends of said surfaces.

8. A continuous heat treating apparatus comprising an enclosure having an entrance and an exit, means for feeding work continuously through said enclosure by way of said entrance and said exit, heat exchangers providing a series of elongate heat exchanging surfaces arranged transversely to the travel of said work for exchanging heat with the latter, and means for ejecting high velocity gas streams into said enclosure longitudinally of said surfaces and adjacent the same, means being provided for also ejecting high velocity gas streams into said enclosure transversely of the travel of said work and adjacent the latter.

9. A continuous heat treating apparatus comprising an enclosure having an entrance and an exit, means for continuously feeding metal strip through said enclosure as an unsupported catenary loop extending from said entrance to said exit, means dividing said enclosure into heating and cooling zones, series of transverse elongate radiant heaters arranged in said heating zone with one series above and the other below said strip for direct heat radiation thereto, means for ejecting a series of high velocity gas streams into said heating zone paralleling and adjacent to said heaters, and radiant heat absorbers in said cooling zone.

10. A continuous heat treating apparatus comprising an enclosure having an entrance and an exit, means for continuously feeding metal strip through said enclosure as an unsupported catenary loop extending from said entrance to said exit, means dividing said enclosure into heating and cooling zones, series of transverse elongate radiant heaters arranged in said heating zone with one series above and the other below said strip for direct heat radiation thereto, means for ejecting a series of high velocity gas streams into said heating zone paralleling and adjacent to said heaters, and a series of transverse elongate radiant heat absorbers in said cooling zone with means for ejecting high velocity gas streams adjacent the same into said cooling zone.

11. A continuous heat treating apparatus comprising an enclosure having an entrance and an exit, means for continuously feeding metal strip through said enclosure as an unsupported catenary loop extending from said entrance to said exit, means dividing said enclosure into heating and cooling zones, series of transverse elongate radiant heaters arranged in said heating zone with one series above and the other below said strip for direct heat radiation thereto, means for ejecting a series of high velocity gas streams into said heating zone paralleling and adjacent to said heaters, and radiant heat absorbers in said cooling zone, the enclosure portions forming the latter having walls shaped to increase their convection heat exchange with the atmosphere as compared to smooth walls.

12. A continuous heat treating apparatus comprising an enclosure having an entrance and an exit, means for continuously feeding metal strip through said enclosure as an unsupported catenary loop extending from said entrance to said exit, means dividing said enclosure into heating and cooling zones, series of transverse elongate radiant heaters arranged in said heating zone with one series above and the other below said strip for direct heat radiation thereto, means for ejecting a series of high velocity gas streams into said heating zone paralleling and adjacent to said heaters, with the adjacent streams of each series ejecting from opposite ends of said heaters to produce turbulence in said heating zone.

13. A continuous heat treating apparatus comprising an enclosure having an entrance and an exit, means for continuously feeding metal strip through said enclosure as an unsupported catenary loop extending from said entrance to said exit, means dividing said enclosure into heating and cooling zones, a series of transverse elongate two-legged radiant heaters arranged in said heating zone with one series above and another below said strip for direct heat radiation thereto with all of said heaters spaced from the inner wall of said heating zone, one leg of each of said heaters being hotter than the other and said heaters in each of said series being arranged with the hotter legs adjacent the cooler legs of successive heaters, means for ejecting series of high velocity gas streams into said furnace between the legs of each of said series of heaters longitudinally respecting said legs and adjacent the same from opposite sides of said heating zone so that successive ones of said legs are wiped by oppositely moving ones of said gas streams, means for ejecting a series of gas streams into said heating zone transversely of said strip and adjacent thereto, the portion of said enclosure forming said cooling zone having walls shaped to increase their convection heat exchange with the outer atmosphere as compared with smooth walls, means for controlling the access of the outer atmosphere to said shaped walls, and controllable radiant heat absorbers arranged in said cooling zone for direct absorption of heat from said strip.

14. A continuous heat treating apparatus comprising an enclosure having an entrance and an exit, means for continuously feeding metal strip through enclosure as an unsupported catenary loop extending from said entrance to said exit, means dividing said enclosure into heating and cooling zones, a series of transverse elongate two-legged radiant heaters arranged in said heating zone with one series above and another below said strip for direct heat radiation thereto with all of said heaters spaced from the inner wall of said heating zone, one leg of each of said heaters being hotter than the other and said heaters in each of said series being arranged with the hotter legs adjacent the cooler legs of successive heaters, means for ejecting series of high velocity gas streams into said furnace between the legs of each of said series of heaters longitudinally respecting said legs and adjacent the same from opposite sides of said heating zone so that successive ones of said legs are wiped by oppositely moving ones of said gas streams, means for ejecting a series of gas streams into said heating zone transversely of said strip and adjacent thereto, the portion of said enclosure forming said cooling zone having walls shaped to increase their convection heat exchange with the outer atmosphere as compared with smooth walls, means for controlling the access of the outer atmosphere to said shaped walls, and controllable radiant heat absorbers arranged in said cooling zone for direct absorption of heat from said strip, means being provided for ejecting high velocity gas streams into said cooling zone adjacent said heat absorbers.

15. A continuous heat treating apparatus comprising an enclosure having an entrance and an exit, means for continuously feeding metal strip through said enclosure as an unsupported catenary loop extending from said entrance to said exit, means dividing said enclosure into heating and cooling zones, a series of transverse elongate two-legged radiant heaters arranged in said heating zone with one series above and another below said strip for direct heat radiation thereto with all of said heaters spaced from the inner wall of said heating zone, one leg of each of said heaters being hotter than the other and said heaters in each of said series being arranged with the hotter legs adjacent the cooler legs of successive heaters, means for ejecting series of high velocity gas streams into said furnace between the legs of each of said series of heaters longitudinally respecting said legs and adjacent the same from opposite sides of said heating zone so that successive ones of said legs are wiped by oppositely moving ones of said gas streams, means for ejecting a series of gas streams into said heating zone transversely of said strip and adjacent thereto, the portion of said enclosure forming said cooling zone having walls shaped to increase their convection heat exchange with the outer atmosphere as compared with smooth walls, means for controlling the access of the outer atmosphere to said shaped walls, and controllable radiant heat absorbers arranged in said cooling zone for direct absorption of heat from said strip, means being provided for automatically controlling said heat absorbers in response to the temperature of said strip as it leaves said heating zone.

DEXTER EDGE.